US010042550B2

(12) United States Patent
Hwang et al.

(10) Patent No.: US 10,042,550 B2
(45) Date of Patent: *Aug. 7, 2018

(54) DISPLAYING VIRTUAL TARGET WINDOW ON MOBILE DEVICE BASED ON DIRECTIONAL GESTURE

(71) Applicant: International Business Machines Corporation, Armonk, NY (US)

(72) Inventors: Inseok Hwang, Austin, TX (US); Janani Mukundan, Ithaca, NY (US); Eric J. Rozner, Austin, TX (US); Chungkuk Yoo, Daejeon (KR)

(73) Assignee: International Business Machines Corporation, Armonk, NY (US)

( * ) Notice: Subject to any disclaimer, the term of this patent is extended or adjusted under 35 U.S.C. 154(b) by 141 days.

This patent is subject to a terminal disclaimer.

(21) Appl. No.: 15/082,799

(22) Filed: Mar. 28, 2016

(65) Prior Publication Data

US 2017/0277266 A1 Sep. 28, 2017

(51) Int. Cl.
*G06F 3/0488* (2013.01)
*G06F 3/0481* (2013.01)

(52) U.S. Cl.
CPC ........ *G06F 3/04883* (2013.01); *G06F 3/0481* (2013.01); *G06F 3/04817* (2013.01); *G06F 3/04886* (2013.01); *G06F 2203/04803* (2013.01)

(58) Field of Classification Search
CPC ............. G06F 3/04883; G06F 3/04886; G06F 3/04895; G06F 3/0481; G06F 3/04817;

(Continued)

(56) References Cited

U.S. PATENT DOCUMENTS 8,769,431 B1 7/2014 Prasad
9,032,316 B1 * 5/2015 Nordstrom .............. G06F 3/048
715/764

(Continued)

FOREIGN PATENT DOCUMENTS

CN 102915201 6/2013
CN 103593136 2/2014

(Continued)

OTHER PUBLICATIONS

Hoober, "How Do Users Really Hold Mobile Devices?" UXmatters, Feb. 2013, 25 pages.

(Continued)

*Primary Examiner* — Darlene M Ritchie
(74) *Attorney, Agent, or Firm* — VanLeeuwen & VanLeeuwen; Mercedes L. Hobson

(57) ABSTRACT

An approach is provided for receiving, from a user of the mobile device, a directional gesture entered on a touch-enabled display screen. The directional gesture was entered using an input instrument, such as a finger or thumb, operated by the user. In response to receiving the directional gesture various actions are performed. A desired element that is currently displayed on the touch-enabled display screen is predicted based on the direction of the directional gesture. The current application display is cloned to create a cloned copy that is provided to the user in a virtual target window in a position that makes the desired element accessible to the user's input instrument.

20 Claims, 14 Drawing Sheets

(58) Field of Classification Search
CPC .............. G06F 3/0484; G06F 3/04842; G06F 2203/04803; H04M 1/72583
See application file for complete search history.

(56) References Cited

U.S. PATENT DOCUMENTS

| | | | |
|---|---|---|---|
| 2007/0146347 A1 | 6/2007 | Rosenberg | |
| 2009/0070670 A1* | 3/2009 | Kishi | G06F 3/04886 715/702 |
| 2010/0306650 A1* | 12/2010 | Oh | G06F 3/0482 715/702 |
| 2011/0047459 A1* | 2/2011 | Van Der Westhuizen | G06F 1/1692 715/702 |
| 2011/0164063 A1* | 7/2011 | Shimotani | G06F 3/0416 345/661 |
| 2011/0169749 A1* | 7/2011 | Ganey | G06F 1/1626 345/173 |
| 2013/0155308 A1* | 6/2013 | Wu | G06T 3/00 348/333.05 |
| 2013/0237288 A1* | 9/2013 | Lee | G06F 3/041 455/566 |
| 2014/0071049 A1 | 3/2014 | Min | |
| 2014/0096049 A1* | 4/2014 | Vonshak | G06F 3/048 715/769 |
| 2014/0362119 A1 | 12/2014 | Freund et al. | |
| 2015/0046825 A1 | 2/2015 | Li | |
| 2015/0212610 A1* | 7/2015 | Tian | G06F 3/041 345/173 |
| 2015/0212697 A1* | 7/2015 | Nordstrom | G06F 3/04842 715/256 |
| 2016/0154536 A1* | 6/2016 | Kim | G06F 3/0488 715/768 |
| 2016/0188112 A1* | 6/2016 | Forlines | G06F 3/0416 345/173 |
| 2016/0357417 A1* | 12/2016 | Gwak | G06F 3/0416 |
| 2017/0139556 A1* | 5/2017 | Josephson | G06F 3/0482 |
| 2017/0139879 A1* | 5/2017 | Sharifi | G06F 3/0482 |
| 2017/0269822 A1* | 9/2017 | Mu | G06F 3/04845 |

FOREIGN PATENT DOCUMENTS

| | | |
|---|---|---|
| CN | 104281393 | 1/2015 |
| EP | 2902867 | 8/2015 |

OTHER PUBLICATIONS

Karlson et al., "ThumbSpace: Generalized One-Handed Input for Touchscreen-Based Mobile Devices," International Federation for Information Processing, 11th IFIP TC 13 International Conference, Rio de Janeiro, Brazil, Sep. 10-14, 2007, pp. 324-338.

Hwang et al., "Displaying Virtual Target Window on Mobile Device Based on User Intent," U.S. Appl. No. 15/082,767, filed Mar. 28, 2016, 54 pages.

"List of IBM Patents or Patent Applications Treated as Related," Letter from Leslie A. Van Leeuwen, Mar. 28, 2016, 1 page.

* cited by examiner

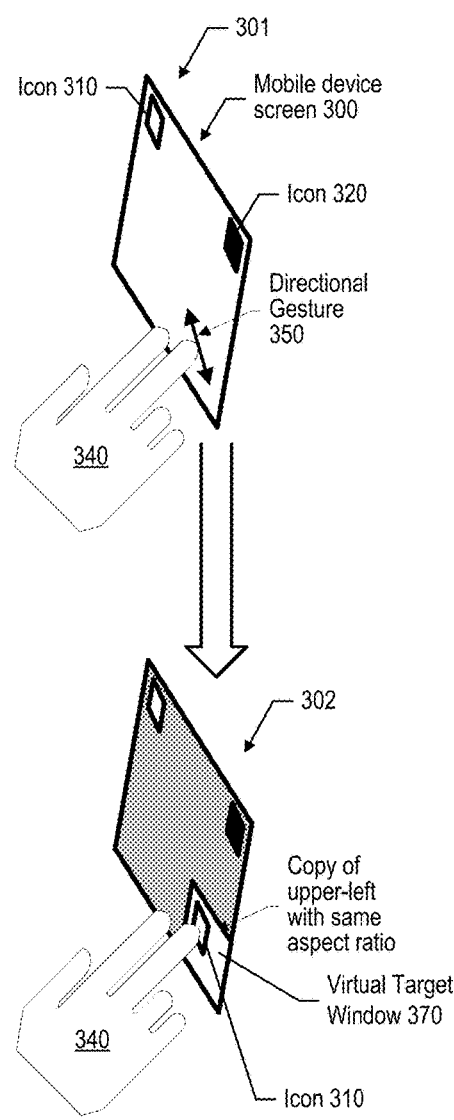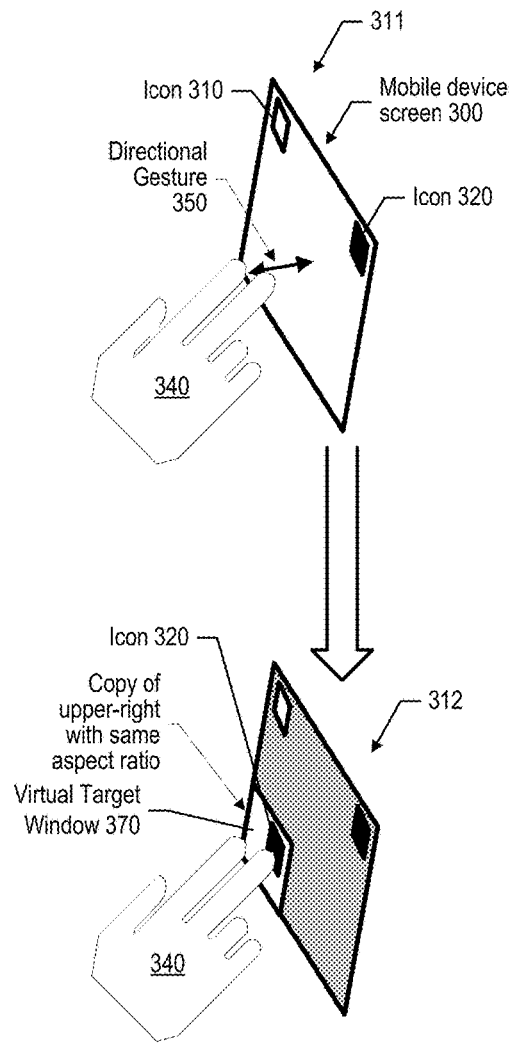
FIG. 3A
FIG. 3B

DISPLAYING VIRTUAL TARGET WINDOW ON MOBILE DEVICE BASED ON DIRECTIONAL GESTURE

BACKGROUND OF THE INVENTION

Technical Field

This disclosure relates to displaying a portion of a mobile display screen in a more accessible location based on a directional gesture received from a user.

Description of Related Art

Mobile devices, such as smart phones and the like, are ubiquitous in modern society. Many users of such devices prefer using the devices in a one-handed fashion so that their other hand is available for other tasks. Due to the size of mobile device screens being somewhat larger than a person's thumb-range or finger-range, oftentimes the user cannot touch the graphical elements displayed on the screen that are out-of-reach. For example, if a user is holding the device toward the bottom of the device, then elements displayed toward the top of the mobile device display screen might be inaccessible by the user's single hand. This inaccessibility causes user frustration and distraction, sometimes leading to the user dropping the mobile device or another item previously held by the user's other hand.

SUMMARY

An approach is provided for receiving, from a user of the mobile device, a directional gesture entered on a touch-enabled display screen. The directional gesture was entered using an input instrument, such as a finger or thumb, operated by the user. In response to receiving the directional gesture various actions are performed. A desired element that is currently displayed on the touch-enabled display screen is predicted based on the direction of the directional gesture. The current application display is cloned to create a cloned copy that is provided to the user in a virtual target window in a position that makes the desired element accessible to the user's input instrument.

The foregoing is a summary and thus contains, by necessity, simplifications, generalizations, and omissions of detail; consequently, those skilled in the art will appreciate that the summary is illustrative only and is not intended to be in any way limiting. Other aspects, inventive features, and advantages of the present invention will be apparent in the non-limiting detailed description set forth below.

BRIEF DESCRIPTION OF THE DRAWINGS

The present invention may be better understood, and its numerous objects, features, and advantages made apparent to those skilled in the art by referencing the accompanying drawings, wherein:

FIG. 3A is a diagram depicting a user making a first directional gesture in order to display a virtual target window of elements in the upper left hand corner of the mobile device display;

FIG. 3B is a diagram depicting a user making a second directional gesture in order to display a virtual target window of elements in the upper right hand corner of the mobile device display;

DETAILED DESCRIPTION

Figure 1:
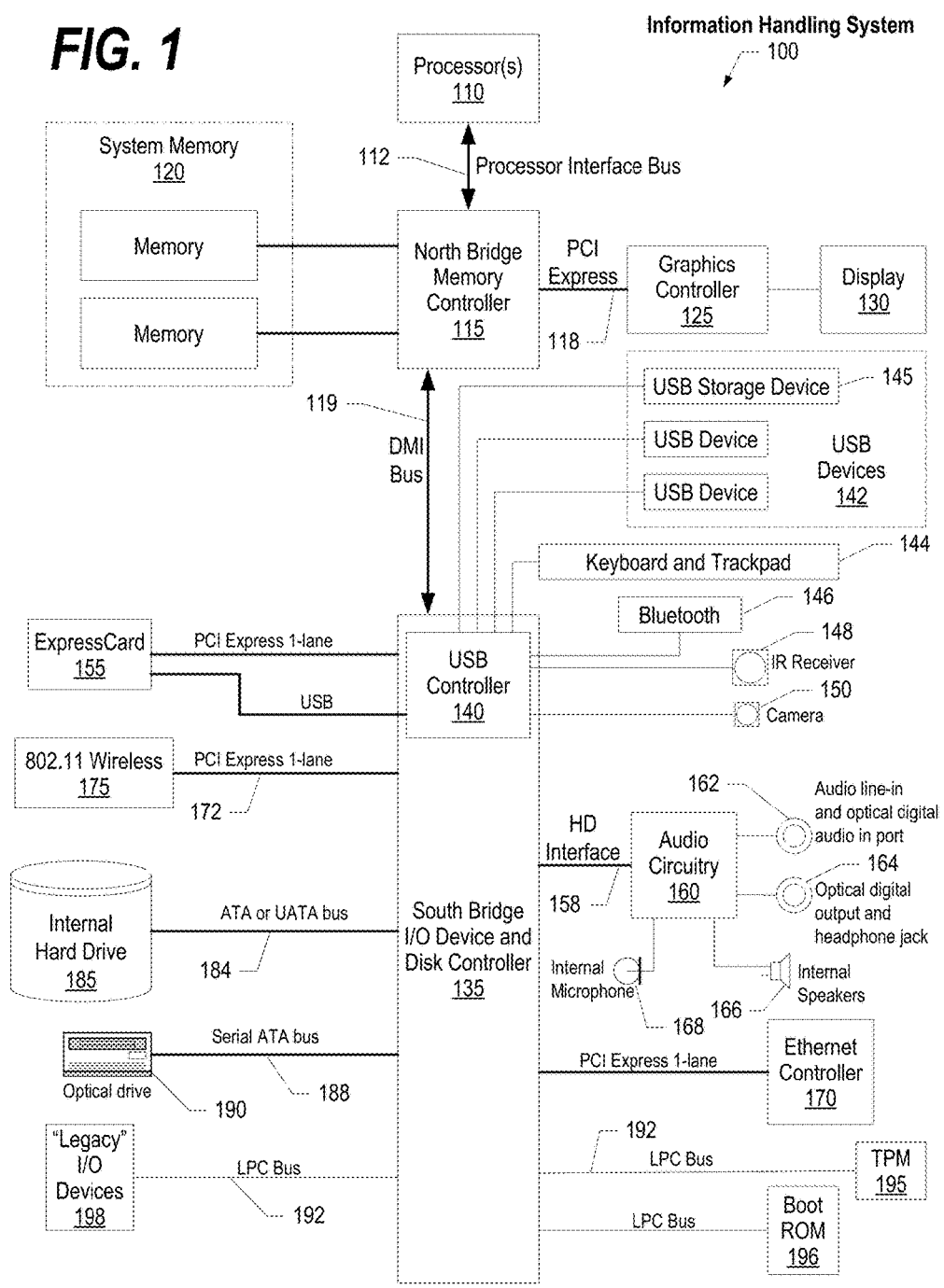
FIG. 1 depicts a block diagram of a processor and components of an information handling system.

FIGS. 1-14 show an approach for creating a virtual target window that is relocated at a position on a mobile device screen so that a desired element is more accessible to an input instrument, such as the user's finger or thumb. In one embodiment, a non-directional gesture is received at the touch-enabled display screen of the mobile device. In this embodiment, the system predicts the element that is displayed on the display screen that is desired by the user. The element is selected by predicting the user's intent with the predicted intent being inferred from previous executions of the application that is currently being displayed on the display screen. In one embodiment, the intent is inferred from previous selections of the element during previous executions of the application. In another embodiment, the intent is inferred by comparing the navigation path of the user in the current session to previous discrete navigation paths taken by the user during previous sessions of the application. In one embodiment, the touch-enabled display screen is both touch-enabled and hover-enabled so that the display screen can respond actions where the user touches the touch-enabled screen as well as to actions where the user hovers the input instrument over the touch-enabled display screen.

In another embodiment, a directional gesture is received at the touch-enabled display screen. The element, or elements, desired by user are inferred based on the direction of the directional gesture. In a further embodiment, the element or elements desired by the user are further inferred based on the magnitude of the received directional gesture. For example, a long directional gesture might infer that the user desires elements further from the user's current finger or thumb position, while a shorter directional gesture might infer that the user desires elements closer to the user's current finger or thumb position.

In a further embodiment, the intent-based approach and the directional-based approach are combined. In this embodiment, the intent of the user based on past executions of the application are combined with the directional nature of the received gesture to determine the element desired by the user. For example, suppose that one element "A" is in the upper left hand corner of the display, while another element "B" is in the upper right hand corner of the display with other elements scattered about. The intent-based approach determines that the user selects element "A" 40% of the time and element "B" 50% of the time with other elements being selected the remaining 10% of the time. However, the user's gesture is shown to be in a direction towards element "A". Because of this additional directional information, the system selects element "A" as the desired element even though element "B" is historically selected more often.

Once an element desired by the user is predicted, using one of the approaches described above, the system clones the current display, disables the current application display, and presents the cloned display in a virtual target window with the predicted element located proximate to the user's input instrument, such as the user's thumb or finger. In one embodiment, the virtual target window is both pan-able and movable so that the user can move within the virtual target window if the user desires a different element. When an element is selected, the virtual target window is removed and the current application display is enabled. The system injects a click, or selection, of the element selected by the user on the virtual target window, thus launching the desired element.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The following detailed description will generally follow the summary of the invention, as set forth above, further explaining and expanding the definitions of the various aspects and embodiments of the invention as necessary. To this end, this detailed description first sets forth a computing environment in FIG. 1 that is suitable to implement the software and/or hardware techniques associated with the invention. A networked environment is illustrated in FIG. 2 as an extension of the basic computing environment, to emphasize that modern computing techniques can be performed across multiple discrete devices.

Figure 2:
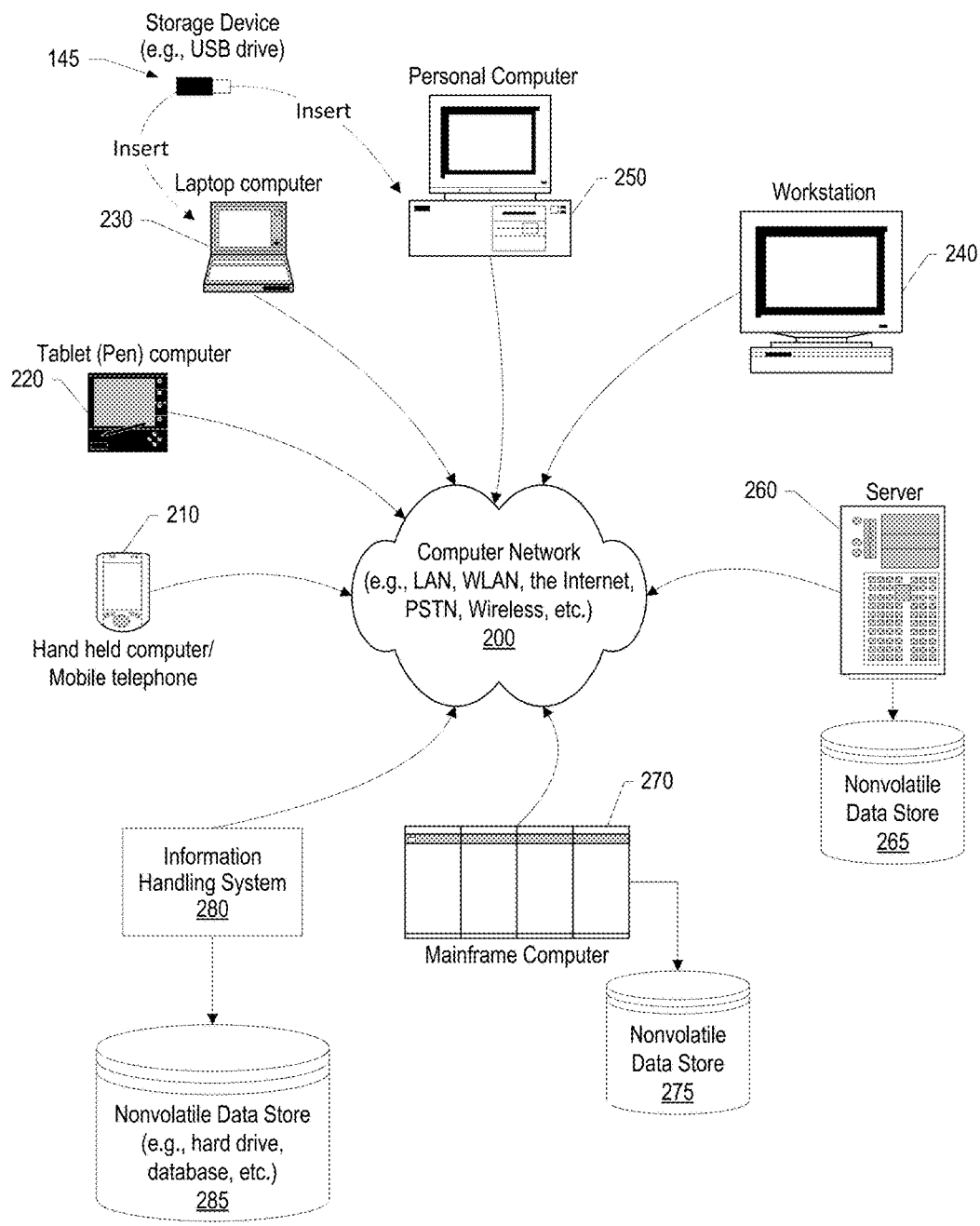
FIG. 2 is a network environment that includes various types of information handling systems interconnected via a computer network.

FIG. 1 illustrates information handling system 100, which is a simplified example of a computer system capable of performing the computing operations described herein. Information handling system 100 includes one or more processors 110 coupled to processor interface bus 112. Processor interface bus 112 connects processors 110 to Northbridge 115, which is also known as the Memory Controller Hub (MCH). Northbridge 115 connects to system memory 120 and provides a means for processor(s) 110 to access the system memory. Graphics controller 125 also connects to Northbridge 115. In one embodiment, PCI Express bus 118 connects Northbridge 115 to graphics controller 125. Graphics controller 125 connects to display device 130, such as a computer monitor.

Northbridge 115 and Southbridge 135 connect to each other using bus 119. In one embodiment, the bus is a Direct Media Interface (DMI) bus that transfers data at high speeds in each direction between Northbridge 115 and Southbridge 135. In another embodiment, a Peripheral Component Interconnect (PCI) bus connects the Northbridge and the Southbridge. Southbridge 135, also known as the I/O Controller Hub (ICH) is a chip that generally implements capabilities that operate at slower speeds than the capabilities provided by the Northbridge. Southbridge 135 typically provides various busses used to connect various components. These busses include, for example, PCI and PCI Express busses, an ISA bus, a System Management Bus (SMBus or SMB), and/or a Low Pin Count (LPC) bus. The LPC bus often connects low-bandwidth devices, such as boot ROM 196 and "legacy" I/O devices (using a "super I/O" chip). The "legacy" I/O devices (198) can include, for example, serial and parallel ports, keyboard, mouse, and/or a floppy disk controller. The LPC bus also connects Southbridge 135 to Trusted Platform Module (TPM) 195. Other components often included in Southbridge 135 include a Direct Memory Access (DMA) controller, a Programmable Interrupt Controller (PIC), and a storage device controller, which connects Southbridge 135 to nonvolatile storage device 185, such as a hard disk drive, using bus 184.

ExpressCard 155 is a slot that connects hot-pluggable devices to the information handling system. ExpressCard 155 supports both PCI Express and USB connectivity as it connects to Southbridge 135 using both the Universal Serial Bus (USB) the PCI Express bus. Southbridge 135 includes USB Controller 140 that provides USB connectivity to devices that connect to the USB. These devices include webcam (camera) 150, infrared (IR) receiver 148, keyboard and trackpad 144, and Bluetooth device 146, which provides for wireless personal area networks (PANs). USB Controller 140 also provides USB connectivity to other miscellaneous USB connected devices 142, such as a mouse, removable nonvolatile storage device 145, modems, network cards, ISDN connectors, fax, printers, USB hubs, and many other types of USB connected devices. While removable nonvolatile storage device 145 is shown as a USB-connected device, removable nonvolatile storage device 145 could be connected using a different interface, such as a Firewire interface, etcetera.

Wireless Local Area Network (LAN) device 175 connects to Southbridge 135 via the PCI or PCI Express bus 172. LAN device 175 typically implements one of the IEEE 802.11 standards of over-the-air modulation techniques that all use the same protocol to wireless communicate between information handling system 100 and another computer system or device. Optical storage device 190 connects to Southbridge 135 using Serial ATA (SATA) bus 188. Serial ATA adapters and devices communicate over a high-speed serial link. The Serial ATA bus also connects Southbridge 135 to other forms of storage devices, such as hard disk drives. Audio circuitry 160, such as a sound card, connects to Southbridge 135 via bus 158. Audio circuitry 160 also provides functionality such as audio line-in and optical digital audio in port 162, optical digital output and headphone jack 164, internal speakers 166, and internal microphone 168. Ethernet controller 170 connects to Southbridge 135 using a bus, such as the PCI or PCI Express bus. Ethernet controller 170 connects information handling system 100 to a computer network, such as a Local Area Network (LAN), the Internet, and other public and private computer networks.

While FIG. 1 shows one information handling system, an information handling system may take many forms. For example, an information handling system may take the form of a desktop, server, portable, laptop, notebook, or other form factor computer or data processing system. In addition, an information handling system may take other form factors such as a personal digital assistant (PDA), a gaming device, ATM machine, a portable telephone device, a communication device or other devices that include a processor and memory.

The Trusted Platform Module (TPM 195) shown in FIG. 1 and described herein to provide security functions is but one example of a hardware security module (HSM). Therefore, the TPM described and claimed herein includes any type of HSM including, but not limited to, hardware security devices that conform to the Trusted Computing Groups (TCG) standard, and entitled "Trusted Platform Module (TPM) Specification Version 1.2." The TPM is a hardware security subsystem that may be incorporated into any number of information handling systems, such as those outlined in FIG. 2.

FIG. 2 provides an extension of the information handling system environment shown in FIG. 1 to illustrate that the methods described herein can be performed on a wide variety of information handling systems that operate in a networked environment. Types of information handling systems range from small handheld devices, such as handheld computer/mobile telephone 210 to large mainframe systems, such as mainframe computer 270. Examples of handheld computer 210 include personal digital assistants (PDAs), personal entertainment devices, such as MP3 players, portable televisions, and compact disc players. Other examples of information handling systems include pen, or tablet, computer 220, laptop, or notebook, computer 230, workstation 240, personal computer system 250, and server 260. Other types of information handling systems that are not individually shown in FIG. 2 are represented by information handling system 280. As shown, the various information handling systems can be networked together using computer network 200. Types of computer network that can be used to interconnect the various information handling systems include Local Area Networks (LANs), Wireless Local Area Networks (WLANs), the Internet, the Public Switched Telephone Network (PSTN), other wireless networks, and any other network topology that can be used to interconnect the information handling systems. Many of the information handling systems include nonvolatile data stores, such as hard drives and/or nonvolatile memory. Some of the information handling systems shown in FIG. 2 depicts separate nonvolatile data stores (server 260 utilizes nonvolatile data store 265, mainframe computer 270 utilizes nonvolatile data store 275, and information handling system 280 utilizes nonvolatile data store 285). The nonvolatile data store can be a component that is external to the various information handling systems or can be internal to one of the information handling systems. In addition, removable nonvolatile storage device 145 can be shared among two or more information handling systems using various techniques, such as connecting the removable nonvolatile storage device 145 to a USB port or other connector of the information handling systems.

FIG. 3A is a diagram depicting a user making a first directional gesture in order to display a virtual target window of elements in the upper left hand corner of the mobile device display. Touch-enabled mobile device screen 300, such as that found on a smartphone or tablet system, includes a number of elements, such as icon 310 and icon 320. In the depiction, the icons are too far away from the user's hand (input instrument 340) unless the user uses two hands to operate the device. Instead, the user performs a directional gesture 350 to indicate which portion of the display, and consequently which element, the user wishes to select. In the first example shown, in depiction 301, directional gesture 350 is in an upper-left direction to indicate that the user wishes to access elements in the upper left portion of display 300. The result, shown in depiction 302, is virtual target window 370 which is clone of the original display appearing on the display with the predicted element, in this case icon 310, appearing proximate to the user's input instrument 340.

FIG. 3B is a diagram depicting a user making a second directional gesture in order to display a virtual target window of elements in the upper right hand corner of the mobile device display. Similar to the depiction shown in 301, in depiction 311, the user performs directional gesture 350, in this case the gesture is in a direction indicating that the user wishes to access an element located in the upper right portion of the display. Resulting depiction 312 shows the display of virtual target window 370 with the desired element, here icon 320, appearing proximate to the user's input instrument.

In one embodiment, rather than shrinking the elements shown in the virtual target window, the elements are shown in the same size as the elements on the original application display. In addition, the aspect ratio used to display the virtual target window is the same as the aspect ratio used to display the original application on display screen 300.

Figure 4:
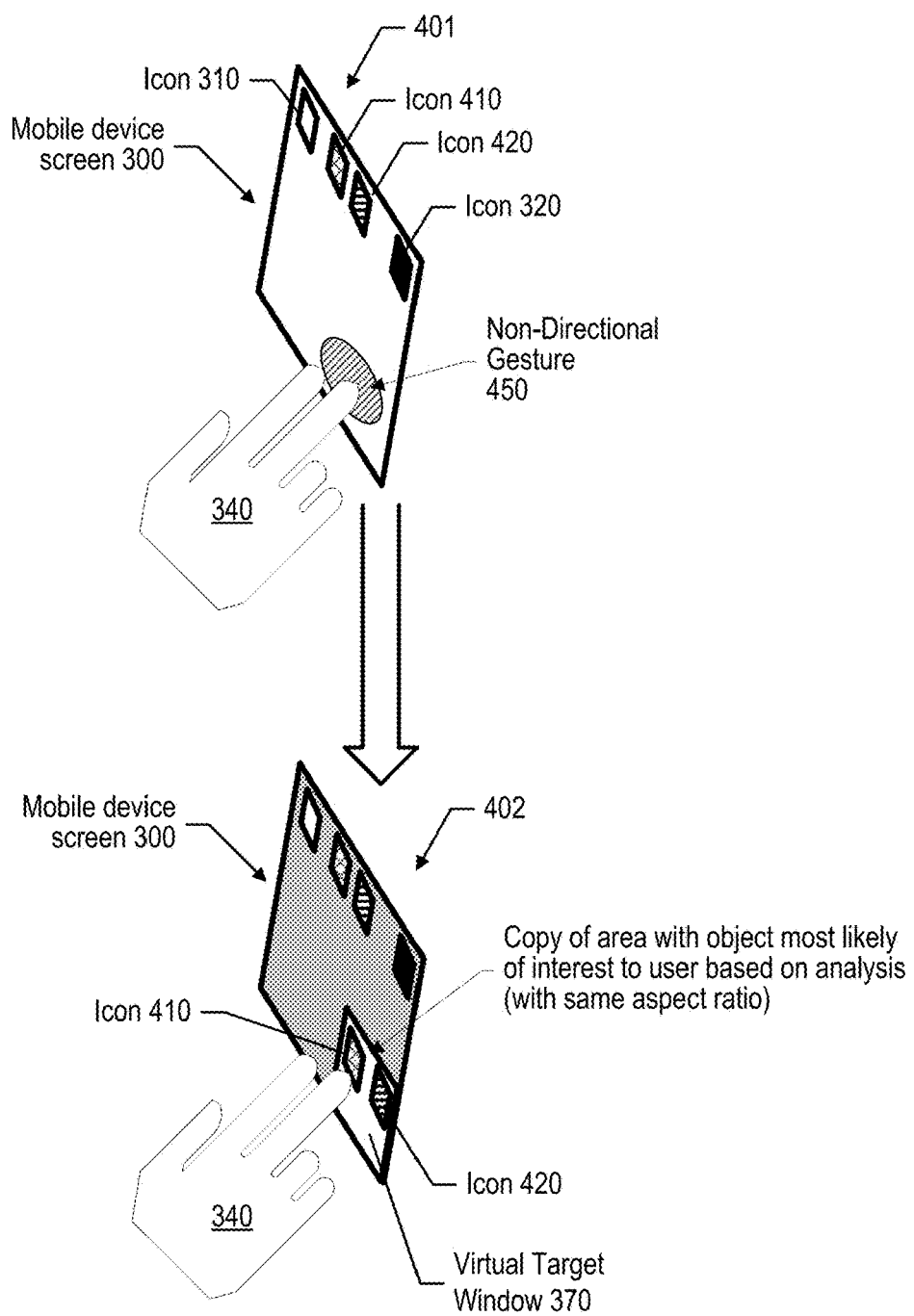
FIG. 4 is a diagram depicting a user making a non-directional gesture in order to display a virtual target window of elements based on the user's determined intent derived from the user's past usage of the displayed application.

FIG. 4 is a flowchart is a diagram depicting a user making a non-directional gesture in order to display a virtual target window of elements based on the user's determined intent derived from the user's past usage of the displayed application. In depiction 401, touch-enabled mobile device screen 300 is shown with additional elements 410 and 420. In this embodiment, the user uses input instrument 340, such as the user's finger or thumb, to perform non-directional gesture 450 on the display screen. Resulting depiction 402 shows virtual target window 370 with an element that is predicted to be desired by the user based on an analysis of the user's intent. In one embodiment, the user's intent is inferred from previous element selections from the application window being display. In another embodiment, the user's intent is inferred from the navigation steps performed by the user prior to the entry of the non-directional gesture. In this embodiment, the user's current navigation steps are compared to previous sets of discrete navigation steps to infer the element most likely desired by the user. In a hybrid embodiment, a combination of the previous element selections and current navigation path are used to infer the user's intent. Finally, in a further hybrid embodiment, gesture 450 can be a directional gesture to combine the intent inferred from the user's previous element selections and/or navigation path with the intent shown from the direction of the gesture entered by the user.

Figure 5:
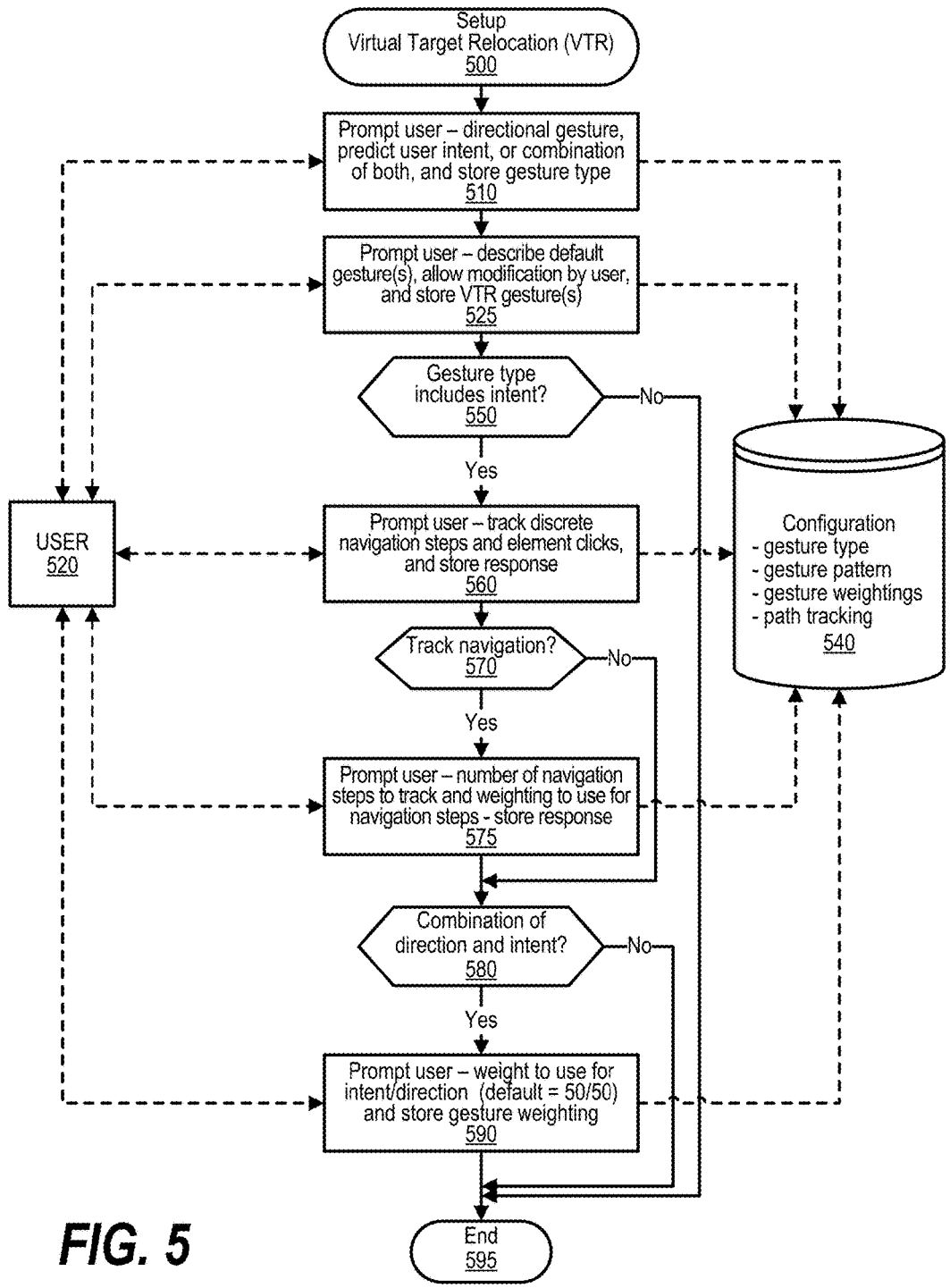
FIG. 5 is a flowchart showing steps taken to perform setup processing and gather user preferences.

FIG. 5 is a flowchart showing steps taken to perform setup processing and gather user preferences. FIG. 5 processing commences at 500 and shows the steps taken by a process that allows a user to setup the virtual target relocation (VTR) tool. At step 510, the process prompts user 520 regarding the type of gesture desired. The user can select a directional gesture, a non-directional gesture where the system predicts the user's intent, or a combination of both types of gestures. Step 510 stores the selected gesture type in data store 540.

At step 525, the process prompts user 520 to provide the gesture. In one embodiment, the process describes the default gesture to the user and allows the user to modify the gesture. Step 525 stores the gesture that will be used in data store 540. The process determines whether the gesture type selected by the user includes analyzing the user's intent (decision 550). If gesture type includes analyzing the user's intent (the intent or combo type), then decision 550 branches to the 'yes' branch to perform steps 560 through 590. On the other hand, if the gesture type is strictly a directional gesture type, then decision 550 branches to the 'no' branch bypassing the remaining steps and the process ends at 595.

At step 560, the process prompts user 520 whether the user wants the system to track the user's discrete navigation steps within applications and/or element selections. The response received from the user is stored in data store 540. The process determines whether the user has chosen to track navigation steps (decision 570). If the user has chosen to track navigation steps, then decision 570 branches to the 'yes' branch to perform step 575. On the other hand, if the user has not chosen to track navigation steps, then decision 570 branches to the 'no' branch bypassing step 575. At step 575, the process prompts user 520 regarding the number of navigation steps to track as well as the weighting to apply to navigation steps. Weighting can be set to weight navigation steps more or less heavily as compared to intent inferred from previous element selections. The data gathered by step 575 is stored in data store 540.

The process determines whether the user has requested to use a combination of direction and intent when a gesture is received (decision 580). If the user has requested to use a combination of direction and intent, then decision 580 branches to the 'yes' branch to perform step 590. On the other hand, if the user has not requested to use a combination of direction and intent, then decision 580 branches to the 'no' branch bypassing step 590. At step 590, the process prompts user 520 regarding the weight to use for intent aspects and direction aspects when a gesture is received. In one embodiment, the default is split with each being equally weighted. The weighting data gathered by step 590 is stored in data store 540. FIG. 5 processing thereafter ends at 595.

Figure 6:
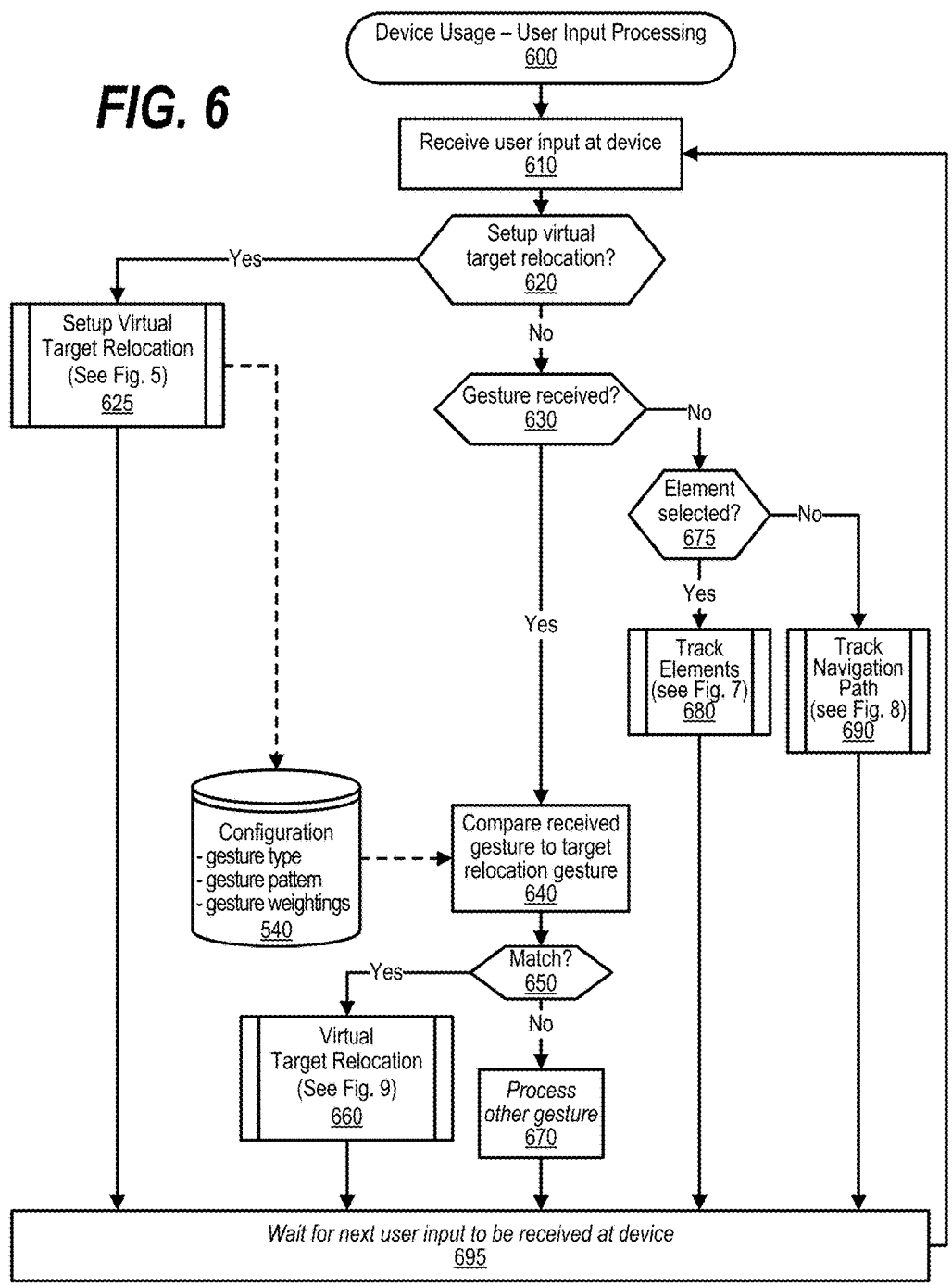
FIG. 6 is a flowchart showing steps taken during device usage to process user inputs received at the device.

FIG. 6 is a flowchart showing steps taken during device usage to process user inputs received at the device. FIG. 6 processing commences at 600 and shows the steps taken by a process that handles device usage and user inputs. At step 610, the process receives user input at the touch-enabled device. The process determines whether the input was to setup the user's virtual target relocation preferences (decision 620). If the input was to setup the user's virtual target relocation preferences, then decision 620 branches to the 'yes' branch to perform predefined process 625. On the other hand, if the input was not to setup the user's virtual target relocation preferences, then decision 620 branches to the 'no' branch for further processing. At predefined process 625, the process performs the Setup Virtual Target Relocation routine used to capture the user's preferences (see FIG. 5 and corresponding text for processing details).

If setup is not being performed, then decision 620 branches to the 'no' branch whereupon the process determines whether a gesture was received from the user (decision 630). If a gesture was received from the user, then decision 630 branches to the 'yes' branch to process the received gesture using steps 640 through 670. On the other hand, if a gesture was not received from the user, then decision 630 branches to the 'no' branch for further processing using steps 675 through 690.

When a gesture is received, then steps 640 through 670 are performed. At step 640, the process compares the gesture received from the user to the target relocation gesture. The process next determines whether the gesture received from the user matches the target relocation gesture (decision 650). If the gesture received from the user matches the target relocation gesture, then decision 650 branches to the 'yes' branch whereupon, at predefined process 660, the process performs the Virtual Target Relocation routine (see FIG. 9 and corresponding text for processing details). On the other hand, if the gesture received from the user does not match the target relocation gesture, then decision 650 branches to the 'no' branch whereupon, at step 670, some other gesture that was received by the user is processed.

Returning to decision 630, if a gesture was not received, then the process branches to the 'no' branch whereupon the process next determines whether an element has been selected by the user (decision 675). If an element has been selected by the user, then decision 675 branches to the 'yes' branch whereupon, at predefined process 680, the process performs the track elements routine (see FIG. 7 and corresponding text for processing details). On the other hand, if an element has not been selected by the user, then decision 675 branches to the 'no' branch whereupon, at predefined process 690, the process performs the track navigation path routine (see FIG. 8 and corresponding text for processing details).

At step 695, the process waits for next user input to be received at device. When the next input is received, processing loops back to step 610 to receive and process the input as described above.

Figure 7:
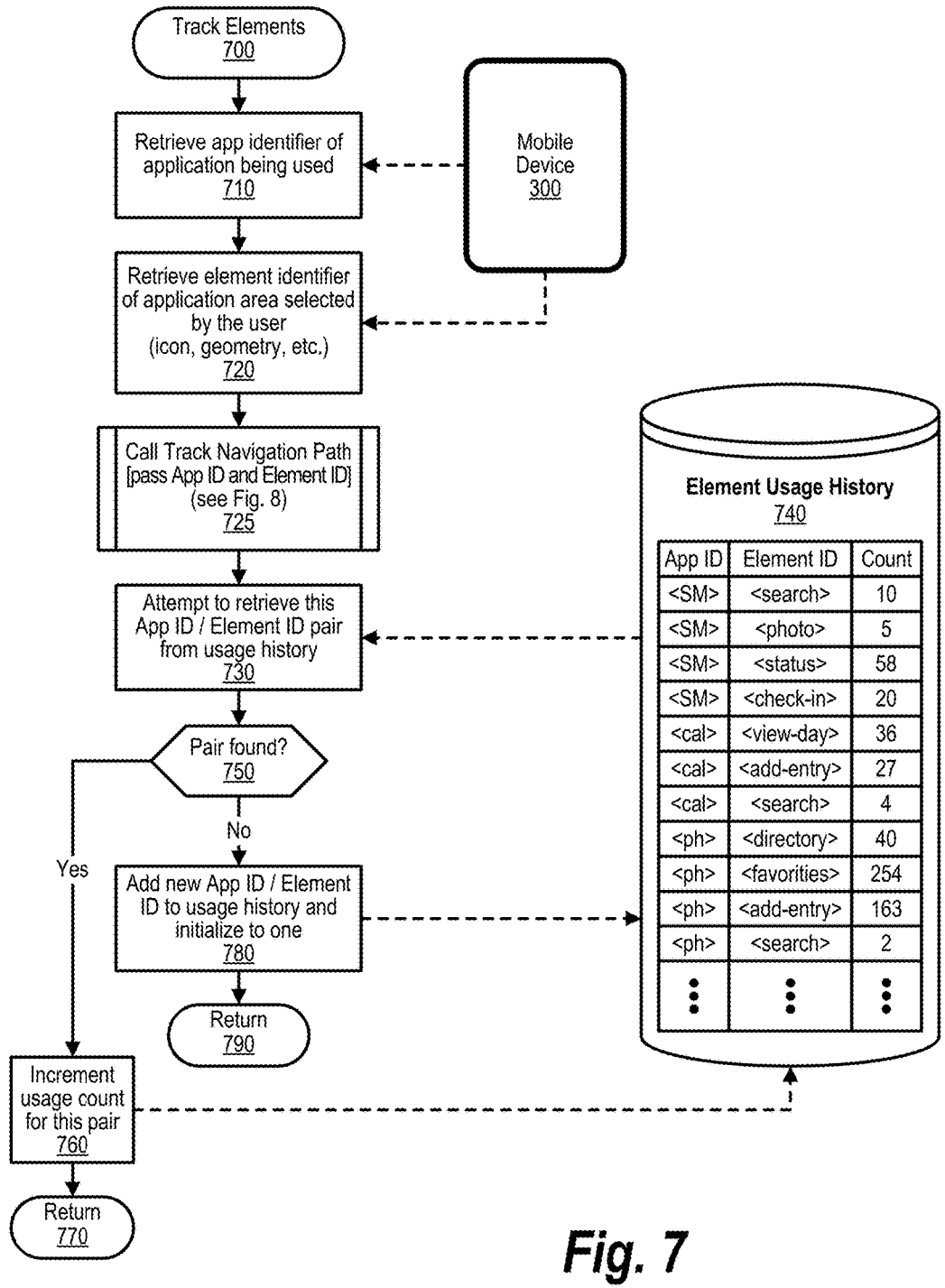
FIG. 7 is a flowchart showing steps taken to track elements selected by the user in order to gather an element usage history to determine the user's intent when using a particular application.

FIG. 7 is a flowchart showing steps taken to track elements selected by the user in order to gather an element usage history to determine the user's intent when using a particular application. FIG. 7 processing commences at 700 and shows the steps taken by a process that track elements selected by the user. At step 710, the process retrieves the application identifier of the application that is being used on the mobile device (e.g., a web site running on a browser, an application executing on the mobile device, etc.). Examples of applications can include social media applications and web sites, calendar applications, telephone applications, and the like.

At step 720, the process retrieves the element identifier of the application area that was selected by the user (e.g., an icon, geometry, etc.). At predefined process 725, the process performs the track navigation path routine and passes the routine the application identifier and the element identifier (see FIG. 8 and corresponding text for processing details).

At step 730, the process attempts to retrieve the received application identifier and element identifier pair from usage history data store 740. The process determines whether the pair searched in step 730 was found in data store 740 (decision 750). If the pair was found, then decision 750 branches to the 'yes' branch to perform step 760 where the process increments the usage count for this pair and stores the updated usage count in data store 740 and processing thereafter returns to the calling routine (see FIG. 6) at 770.

On the other hand, if the pair was not found, then decision 750 branches to the 'no' branch whereupon, at step 780, the process adds a new application identifier/element identifier pair to usage history data store 740 and initializes the pair's counter to one and processing thereafter returns to the calling routine (see FIG. 6) at 790.

Figure 8:
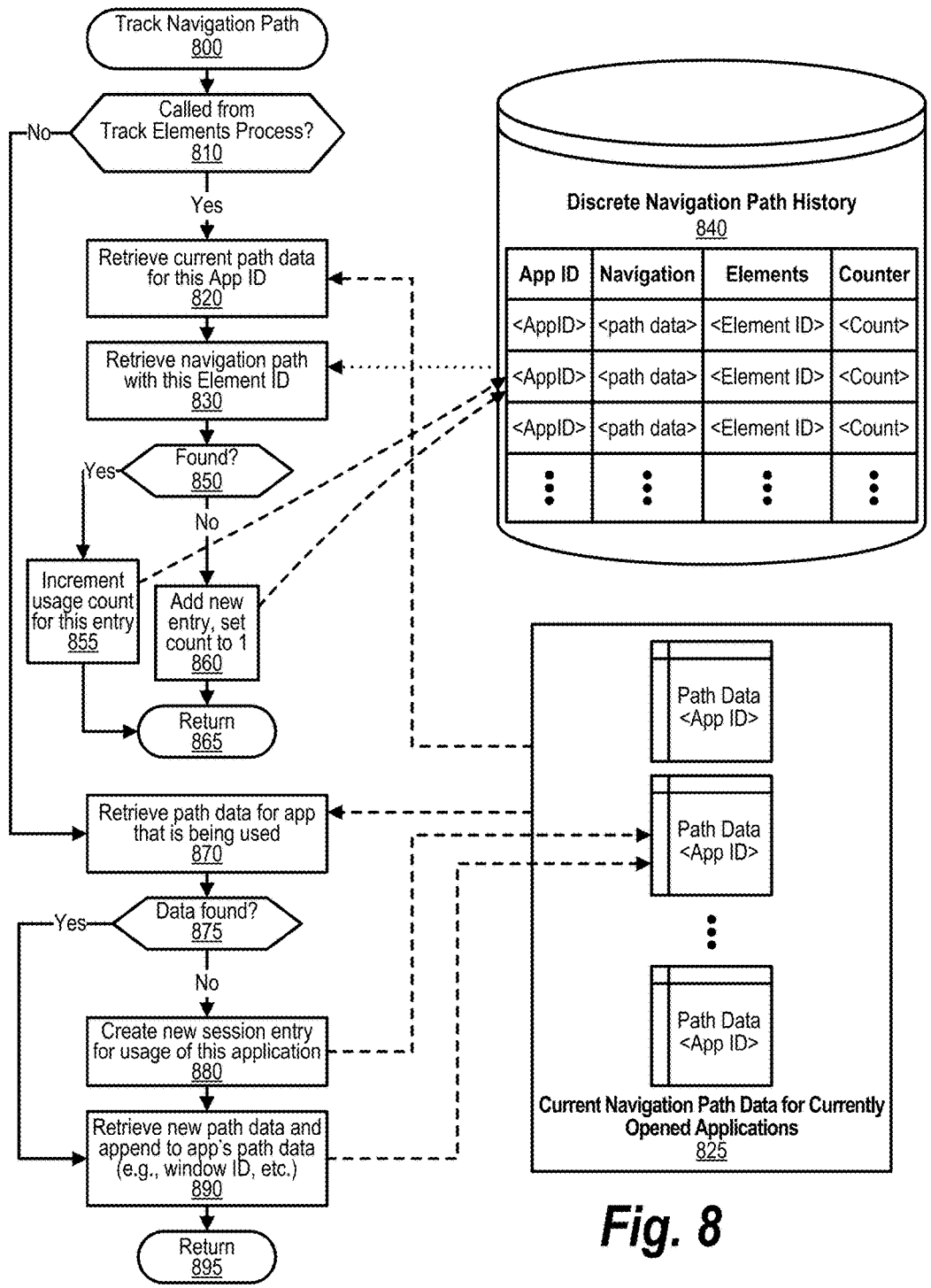
FIG. 8 is a flowchart showing steps taken to track the navigation path taken by the user in order to gather a discrete navigation path history to further determine the user's intent when using a particular application.

FIG. 8 is a flowchart showing steps taken to track the navigation path taken by the user in order to gather a discrete navigation path history to further determine the user's intent when using a particular application. FIG. 8 processing commences at 800 and shows the steps taken by a process that tracks the navigation path taken by a user when using different applications. The process first determines whether the routine was called from the Track Elements process (see FIG. 7) in decision 810. If the routine was called from the Track Elements process, then decision 810 branches to the 'yes' branch to perform steps 820 through 865. These steps essentially close an entry for a discrete navigation path ending with an element selection. On the other hand, if the routine was not called from the Track Elements process, then decision 810 branches to the 'no' branch to perform steps 870 through 895 which tracks the user's current path data.

Steps 820 through 865 are performed when an element has been selected by the user with these steps closing the current application path. At step 820, the process retrieves the current navigation path data for this application identifier from memory area 825. At step 830, the process retrieves the discrete navigation path that contains the received element identifier and the current navigation path from data store 840. The process determines whether the current path and element was found in the data store (decision 850). If the current path and element was found in the data store, then decision 850 branches to the 'yes' branch whereupon, at step 855, the process increments the usage counter for the entry and stores the incremented usage counter in data store 840. On the other hand, if an entry with the current path and element was not found in the data store, then decision 850 branches to the 'no' branch whereupon, at step 860, the process adds a new entry to data store 840 with the current application identifier, the navigation path, and the selected element. Step 860 also initializes the entry's counter to one. FIG. 8 processing thereafter returns to the calling routine (see FIG. 6) at 865.

Returning to decision 810, if this routine was not called by the track elements routine, then decision 810 branches to the 'no' branch to perform steps 870 through 895 that keep track of the current path data. At step 870, the process retrieves the current path data for the application that is being used by the user. The path data is retrieved from memory area 825. Note that memory area 825 is used to store current path data for more than one application because the device being used by the user may provide multitasking, in which case the user may have more than one application open at a given time. In such a case, the routine keeps track of the current navigation path used by the user on each of the open applications.

The process determines as to whether data was found for the current application (decision 875). If data was found for the current application, then decision 875 branches to the 'yes' branch which bypasses step 880. On the other hand, if data was not found for the current application, then decision 875 branches to the 'no' branch whereupon, at step 880, the process creates a new session entry for the user's usage of this application with the new session entry being stored in memory area 825. At step 890, the process retrieves the new path data pertaining to an action performed by the user (e.g., navigated to a different window, etc.) and the step further appends the new path data to this application's current path data (e.g., appends the window identifier, etc. pertaining to the new path data, etc.). FIG. 8 processing thereafter returns to the calling routine (see FIG. 6) at 895.

Figure 9:
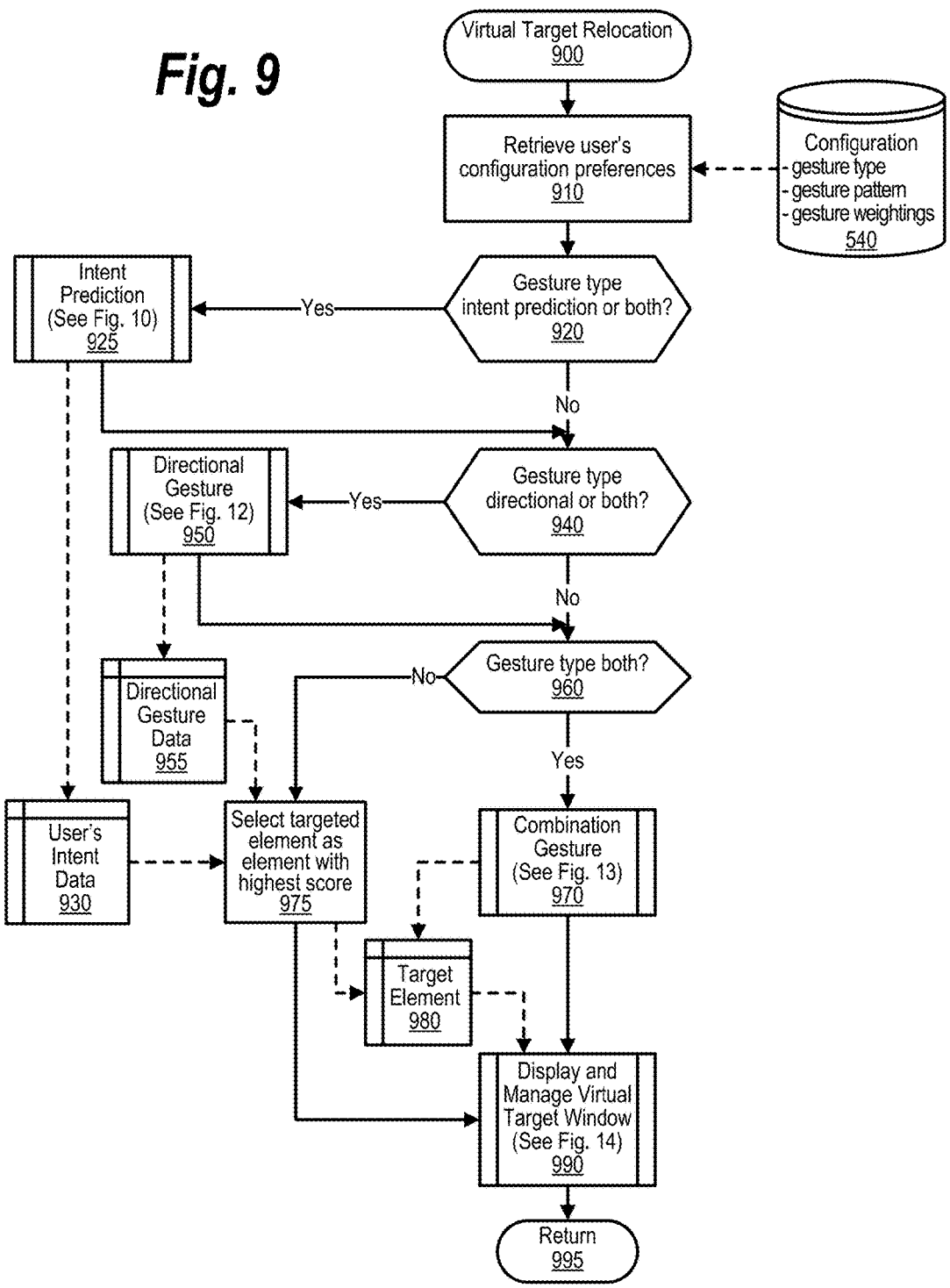
FIG. 9 is a flowchart showing high level steps taken to perform virtual target relocation to display a virtual target window in an area on the mobile device screen more accessible to the user's input instrument.

FIG. 9 is a flowchart showing high level steps taken to perform virtual target relocation to display a virtual target window in an area on the mobile device screen more accessible to the user's input instrument. FIG. 9 processing commences at 900 and shows the steps taken by a process that handles the virtual target relocation. At step 910, the process retrieves the user's configuration preferences from data store 540. The process determines as to whether the gesture type specified in the preferences uses intent prediction or both intent prediction and directional (decision 920). If the gesture type specified in the preferences uses intent prediction or both intent prediction and directional, then decision 920 branches to the 'yes' branch whereupon, at predefined process 925, the process performs the Intent Prediction routine (see FIG. 10 and corresponding text for processing details). Predefined process 925 stores the intent data derived from the user's previous activities in memory area 930. On the other hand, if the specified gesture type did not include an intent component (either intent type or both intent and directional), then decision 920 branches to the 'no' branch bypassing predefined process 925.

The process next determines as to whether the specified gesture type has a directional component (either directional type or both intent and directional) using decision 940. If the specified gesture type has a directional component, then decision 940 branches to the 'yes' branch whereupon, at predefined process 950, the process performs the Directional Gesture routine (see FIG. 12 and corresponding text for processing details). Predefined process 950 stores the directional gesture data derived from the gesture received from the user in memory area 955. On the other hand, if the specified gesture type does not include a directional component, then decision 940 branches to the 'no' branch bypassing predefined process 950.

The process determines as to whether the specified gesture type is a combination gesture type that includes both the derived intent of the user as well as the direction of the gesture (decision 960). If the specified gesture type is a combination gesture type, then decision 960 branches to the 'yes' branch whereupon, at predefined process 970, the process performs the Combination Gesture routine (see FIG. 13 and corresponding text for processing details). On the other hand, if the specified gesture type is not a combination gesture type, then decision 960 branches to the 'no' branch whereupon, at step 975, the process selects the targeted element as element with highest score from either memory area 930 or memory area 955 (only one of which will have data).

Figure 14:
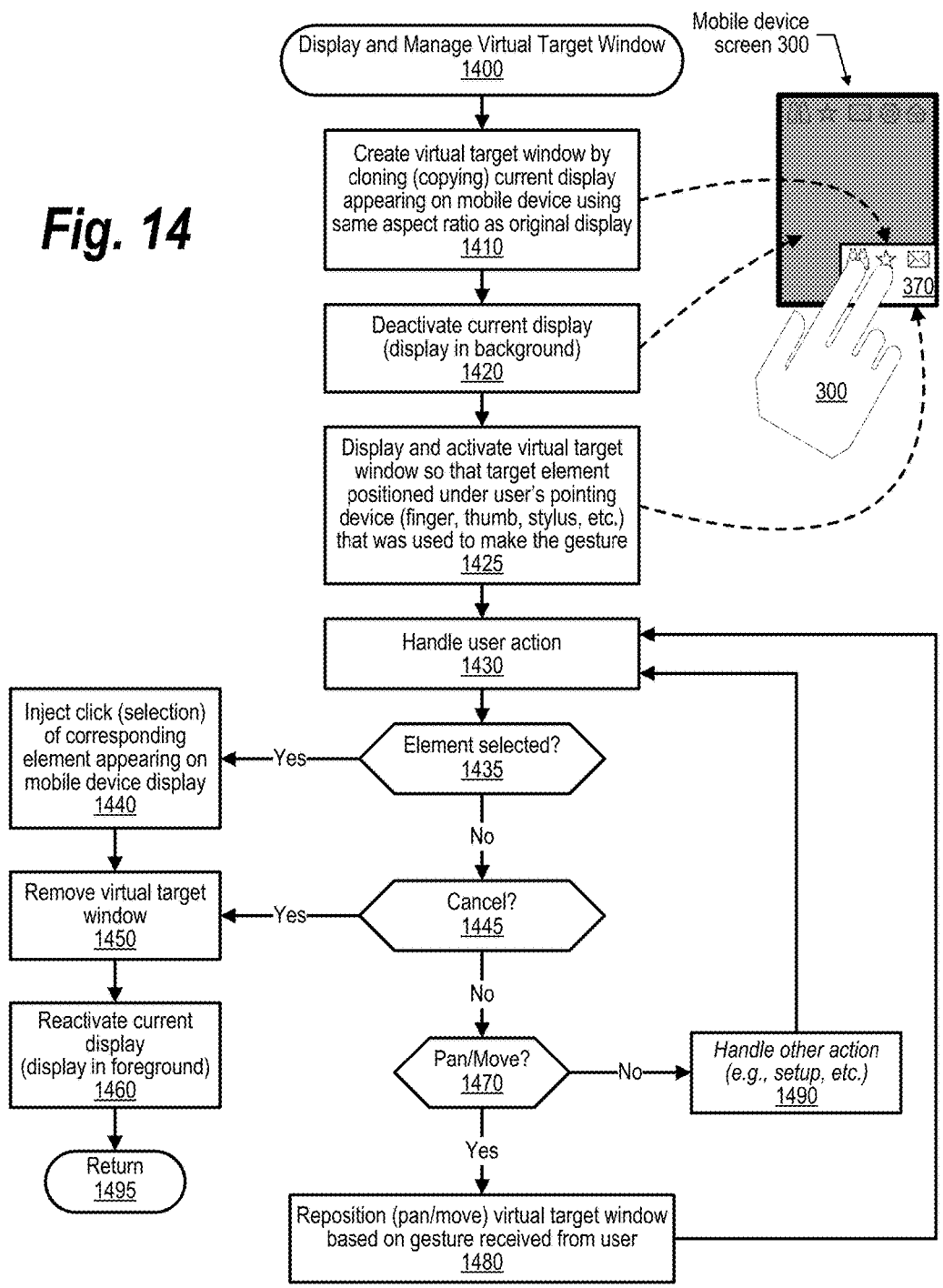
FIG. 14 is a flowchart showing steps taken to display and manage a virtual target window.

At predefined process 990, the process performs the Display and Manage Virtual Target Window routine (see FIG. 14 and corresponding text for processing details). FIG. 9 processing thereafter returns to the calling routine (see FIG. 6) at 995.

Figure 10:
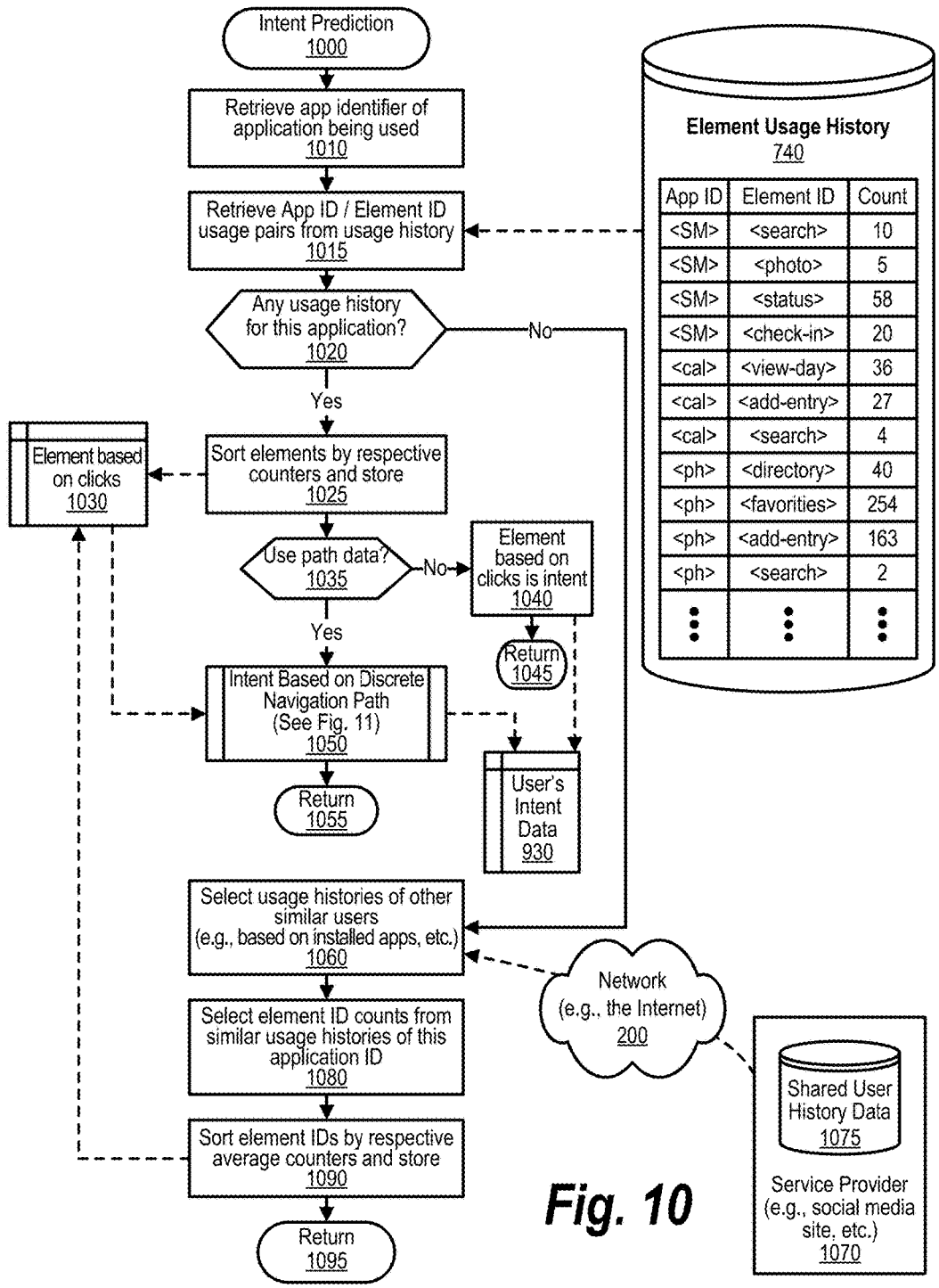
FIG. 10 is a flowchart showing steps taken to perform intent prediction.

FIG. 10 is a flowchart showing steps taken to perform intent prediction. FIG. 10 processing commences at 1000 and shows the steps taken by a process that predicts the intent of the user. At step 1010, the process retrieves the application identifier of the application that is currently being used by the user on the device. At step 1015, the process retrieves the application identifier/element identifier usage pairs from usage history data store 740 for those usage pairs that match the application identifier that is currently being used. The process determines whether there are any usage pairs for this application in the history file (decision 1020). If there is any usage history for this application, then decision 1020 branches to the 'yes' branch to perform steps 1025 through 1055. On the other hand, if no usage history was found for this application, then decision 1020 branches to the 'no' branch to perform steps 1060 through 1095.

If usage history was found, then the process performs steps 1025 through 1055. At step 1025, the process sorts the elements retrieved from data store 740 by the elements' respective counters and stores the sorted set of elements in memory area 1030. The process determines as to whether the user has requested use of navigation path data to infer the user's intent (decision 1035). If the user has requested use of navigation path data to infer the user's intent, then decision 1035 branches to the 'yes' branch whereupon, at predefined process 1050 the process performs the Intent Based on Discrete Navigation Path routine (see FIG. 11 and corresponding text for processing details) and processing returns to the calling routine (see FIG. 9) at 1055. On the other hand, if the user has not requested use of navigation path data to infer the user's intent, then decision 1035 branches to the 'no' branch bypassing predefined process 1050. Instead, at step 1040, the intended element is inferred based on the counter data stored in memory area 1030 (e.g., the element with the highest counter data, etc.). FIG. 10 processing thereafter returns to the calling routine (see FIG. 9) at 1045.

Returning to decision 1020, if there is no usage data pertaining to this application, then decision 1020 branches to the 'no' branch whereupon steps 1060 through 1095 are performed. At step 1060, the process selects usage histories of other similar users (e.g., based on installed apps of other users, etc.). In one embodiment, the usage histories of other similar users is retrieved from service provider 1070, such as a social media site, that maintains a shared user history in data store 1075. At step 1080, the process selects the element identifier counters from such similar usage histories of users that have used this application. At step 1090, the process sorts the selected element identifiers by their respective average counters and stores the sorted data in memory area 1030. The intended element is inferred as being the element with the highest average counter. Processing then returns to the calling routine (see FIG. 9) at 1095.

Figure 11:
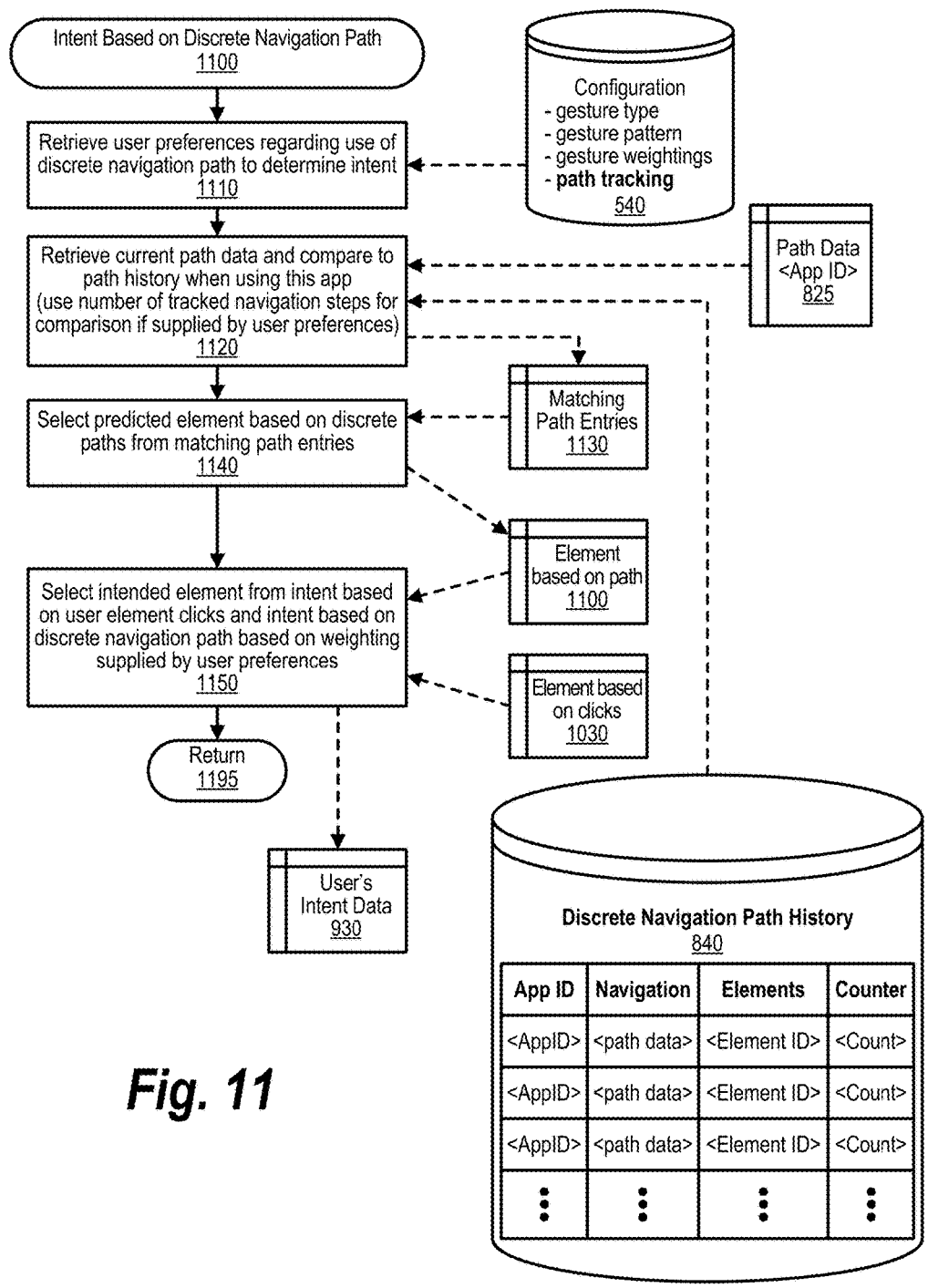
FIG. 11 is a flowchart showing steps taken to perform intent prediction based on a discrete navigation path.

FIG. 11 is a flowchart showing steps taken to perform intent prediction based on a discrete navigation path. FIG. 11 processing commences at 1100 and shows the steps taken by a process that predicts the user's intent based on a discrete navigation path taken by the user. As used herein, the discrete navigation path indicates a sequence of steps (e.g. windows, tabs, or similar units) that the user has gone through, or taken, to reach the current interface.

At step 1110, the process retrieves the user's preferences regarding use of discrete navigation path to determine the user's intent. The user's preferences are retrieved from data store 540. At step 1120, the process retrieves the current path data for this application from memory area 825 and compares the current path data to the discrete navigation path history that the user has taken when using this application in the past. The discrete navigation path entries are retrieved from data store 840. In one embodiment, the process uses the number of tracked navigation steps for comparison if such a number was supplied by the user in the user preferences and stored in data store 540. The matching path entries found by step 1120 are stored in memory area 1130.

At step 1140, the process selects a predicted element based on the discrete navigation paths that were included in matching path entries from data store 840. At step 1150, the process selects (predicts) the intended element from the intent based on the user element clicks and intent based on discrete navigation path based on the weighting that was supplied by the user and retrieved from the user preferences in data store 540. Step 1150 stores the element predicted to be the one intended by the user in memory area 930. In one embodiment, multiple elements can be stored in memory area 930 each with its respective counter that was retrieved from data store 840. In this manner, the elements retrieved based on the user's inferred intent can be compared to elements based on the direction of the gesture when performing a combination intent/direction gesture. FIG. 11 processing thereafter returns to the calling routine (see FIG. 10) at 1195.

Figure 12:
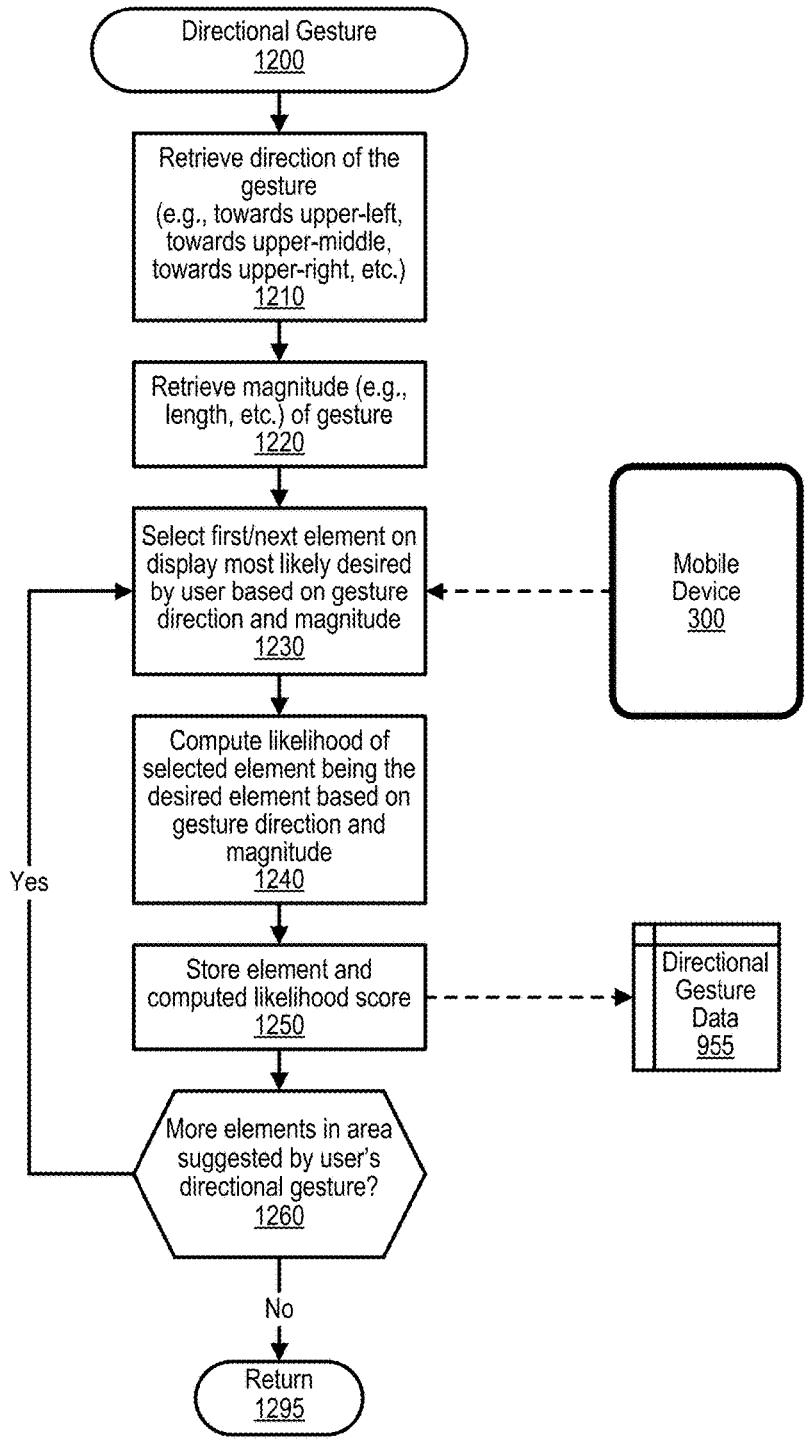
FIG. 12 is a flowchart showing steps taken to identify and utilize a directional gesture input by the user on the mobile device.

FIG. 12 is a flowchart showing steps taken to identify and utilize a directional gesture input by the user on the mobile device. FIG. 12 processing commences at 1200 and shows the steps taken by a process that handles a directional gesture. At step 1210, the process retrieves the direction of the gesture (e.g., towards upper-left, towards upper-middle, towards upper-right, etc.). At step 1220, the process also retrieves the magnitude (e.g., length, etc.) of the received gesture. At step 1230, the process selects the first element on the display that is likely to be desired by user based on the received gesture direction and magnitude data. At step 1240, the process computes a likelihood score that pertains to the selected element being the desired element based on the gesture direction and magnitude. At step 1250, the process stores the selected element and its computed likelihood score in memory area 955.

The process determines as to whether there are more elements in the area suggested by the direction of the user's directional gesture (decision 1260). If there are more elements in the area suggested by the direction of the user's directional gesture, then decision 1260 branches to the 'yes' branch which loops back to step 1230 to select and process the next element as described above. This looping continues until there are no more elements to process, at which point decision 1260 branches to the 'no' branch exiting the loop. FIG. 12 processing thereafter returns to the calling routine (see FIG. 9) at 1295.

Figure 13:
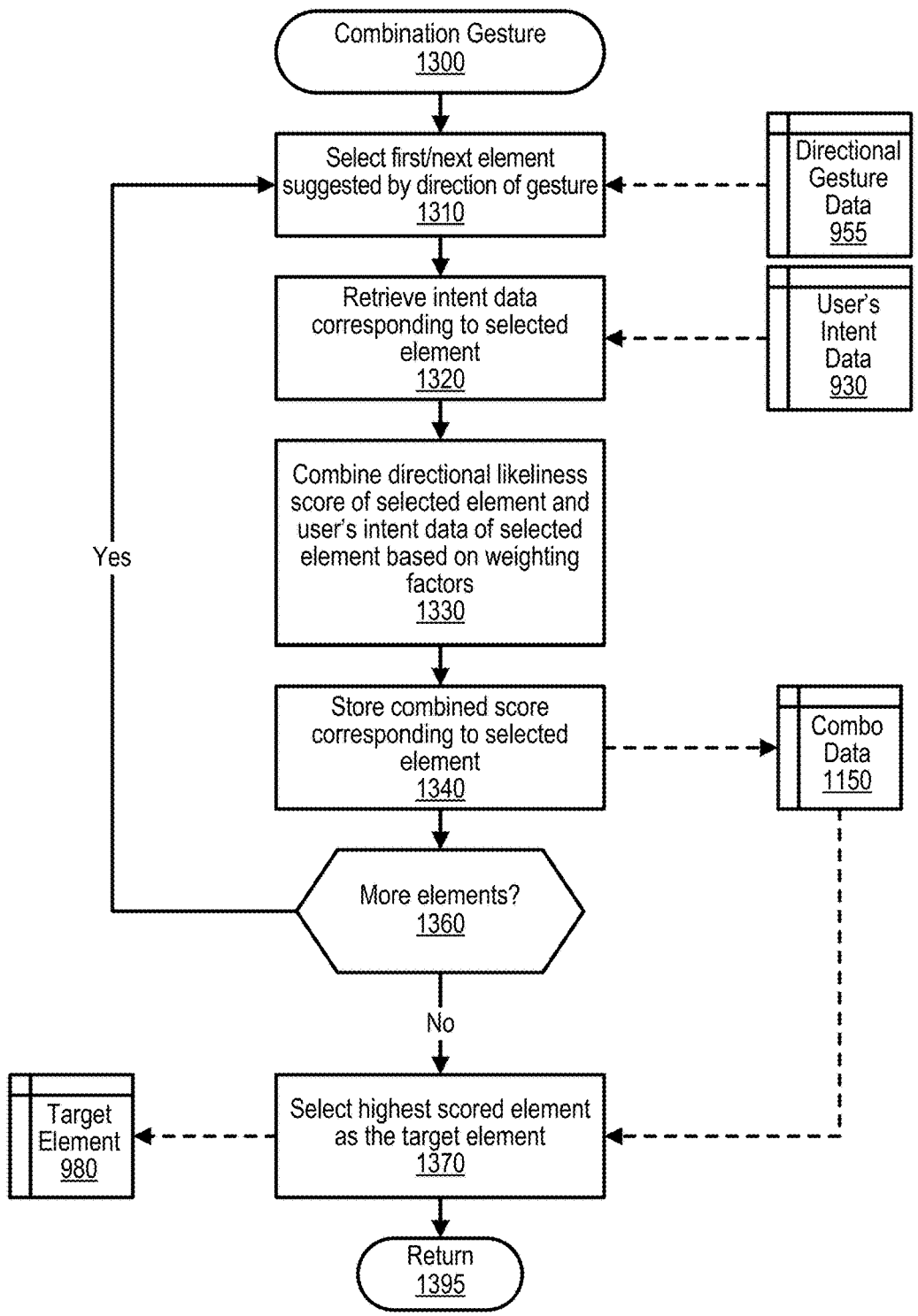
FIG. 13 is a flowchart showing steps taken to combine directional and intent based gestures.

FIG. 13 is a flowchart showing steps taken to combine directional and intent based gestures. FIG. 13 processing commences at 1300 and shows the steps taken by a process that combines intent data with directional gesture data. At step 1310, the process selects the first element suggested by the direction of gesture with the first element retrieved from memory area 955. At step 1320, the process retrieves the intent data corresponding to selected element with the intent data being retrieved from memory area 930. At step 1330, the process combines the directional likeliness score of the selected element (retrieved from memory area 955) and the user's intent data of selected element based on weighting factors that were supplied by the user during setup processing. At step 1340, the process stores combined score corresponding to selected element in memory area 1150.

The process determines as to whether there are more elements from memory area 955 to process (decision 1360). If there are more elements from memory area 955 to process, then decision 1360 branches to the 'yes' branch which loops back to step 1310 to select and process the next element as described above. This looping continues until all of the elements have been processed, at which point decision 1360 branches to the 'no' branch exiting the loop.

At step 1370, the process selects the highest scored element from memory area 1150 as the target element that is predicted to be the intended element of the user. FIG. 13 processing thereafter returns to the calling routine (see FIG. 9) at 1395.

FIG. 14 is a flowchart showing steps taken to display and manage a virtual target window. FIG. 14 processing commences at 1400 and shows the steps taken by a process that displays and manages the virtual target window. At step 1410, the process creates virtual target window 370 by cloning (copying) the current display appearing on mobile device using the same aspect ratio as the original display. At step 1420, the process deactivates the current display and displays the current display in the background.

At step 1425, the process displays and activates virtual target window 370 proximate to the input instrument of the user so that the target element is positioned under or below the user's input instrument (e.g., the user's finger, thumb, stylus, etc.) that was used by the user to make the gesture. At step 1430, the process handles a user action received at the device.

The process determines as to whether an element in the virtual target window was selected (decision 1435). If an element in the virtual target window was selected, then decision 1435 branches to the 'yes' branch to perform steps 1440, 1450, 1460, and 1495. On the other hand, if not element selected, then decision 1435 branches to the 'no' branch bypassing step 1440. The process determines as to whether the user action is to cancel the operation (decision 1445). If the user action is to cancel the operation, then decision 1445 branches to the 'yes' branch to perform steps 1450, 1460, and 1495. On the other hand, if the user action is not to cancel the operation, then decision 1445 branches to the 'no' branch for further processing. The process next determines whether the user action was to pan or move the virtual target window (decision 1470). If the user action was to pan or move the virtual target window, then decision 1470 branches to the 'yes' branch whereupon, at step 1480, the process repositions (pans or moves) the virtual target window based on the pan or move gesture received from user. On the other hand, if the user action was not to pan or move the virtual target window, then decision 1470 branches to the 'no' branch whereupon, at step 1490, the process handles some other action (e.g., setup, etc.) received at the device.

Returning to decision 1435, if an element was selected by the user then, at step 1440, the process injects a click (a selection) of the corresponding element that appears on the mobile device display. At step 1450, the process removes virtual target window 370 from the display and, at step 1460, the process reactivates the current display and display it in the foreground of the display. Returning to decision 1445, if the user cancels the operation, then decision 1445 branches to the 'yes' branch to perform steps 1450 and 1460 as described above (bypassing step 1440). FIG. 14 processing thereafter returns to the calling routine (see FIG. 9) at 1495.

While particular embodiments of the present invention have been shown and described, it will be obvious to those skilled in the art that, based upon the teachings herein, that changes and modifications may be made without departing from this invention and its broader aspects. Therefore, the appended claims are to encompass within their scope all such changes and modifications as are within the true spirit and scope of this invention. It will be understood by those with skill in the art that if a specific number of an introduced claim element is intended, such intent will be explicitly recited in the claim, and in the absence of such recitation no such limitation is present. For non-limiting example, as an aid to understanding, the following appended claims contain usage of the introductory phrases "at least one" and "one or more" to introduce claim elements. However, the use of such phrases should not be construed to imply that the introduction of a claim element by the indefinite articles "a" or "an" limits any particular claim containing such introduced claim element to inventions containing only one such element, even when the same claim includes the introductory phrases "one or more" or "at least one" and indefinite articles such as "a" or "an"; the same holds true for the use in the claims of definite articles.

What is claimed is:

1. A method implemented by an information handling system that includes a processor and a memory accessible by the processor, the information handling system executing on a mobile device with a touch-enabled display screen accessible by the processor, and the method comprising:
receiving, from a user of the mobile device, a directional gesture entered on the touch-enabled display screen, wherein the touch-enabled display screen displays a current application display, comprising a plurality of elements, at an original aspect ratio, and wherein each of the plurality of elements is displayed at a corresponding original size, and wherein the directional gesture was entered using an input instrument operated by the user;
in response to receiving the directional gesture:
predicting one or more desired elements currently displayed on the touch-enabled display screen, wherein the predicting is based on a direction of the directional gesture, and wherein the one or more desired elements are a subset of the plurality of elements;
cloning a portion of the current application display to create a cloned copy, wherein the cloned copy includes only the one or more desired elements; and
providing a virtual target window by displaying the cloned copy on the touch-enabled display screen at the original aspect ratio and in a position that places the one or more desired elements proximate to the input instrument operated by the user, wherein each of the one or more desired elements are displayed at their corresponding original size.

2. The method of claim 1 further comprising:
identifying a magnitude of the directional gesture based on a length of the received directional gesture, wherein the predicting is based on the direction and the magnitude of the directional gesture.

3. The method of claim 2 further comprising:
computing a directional likeliness score corresponding to one or more of the plurality of elements displayed on the current application display, wherein the computed directional likeliness score is based on the received direction and magnitude of the directional gesture in comparison to a position of each of the plurality of elements displayed on the current application display; and
selecting the predicted one or more desired elements based on the directional likeliness scores.

4. The method of claim 1 further comprising:
predicting an intent of the user based on one or more previously received past user actions, wherein the predicted one or more desired elements are based on the direction of the gesture and the predicted intent of the user.

5. The method of claim 4 further comprising:
applying one or more weighting factors to the predicted intent of the user and the direction of the gesture to select the predicted one or more desired elements.

6. The method of claim 1 wherein the providing of the virtual target window further comprises:
deactivating the current application display;
activating the virtual target window, wherein the virtual target window is pan-able and moveable on the touch-enabled display screen; and
responding to a user action received at the virtual target window.

7. The method of claim 6 further comprising:
receiving an element selection as the user action at the virtual target window;
removing the virtual target window;
re-activating the current application display; and
invoking the element at the current application display that corresponds to the received element selection.

8. An information handling system comprising:
one or more processors;
a memory coupled to at least one of the processors;
a touch-enabled display screen accessible by at least one of the processors; and
a set of computer program instructions stored in the memory and executed by at least one of the processors in order to perform actions comprising:
receiving, from a user of the mobile device, a directional gesture entered on the touch-enabled display screen, wherein the touch-enabled display screen displays a current application display, comprising a plurality of elements, at an original aspect ratio, and wherein each of the plurality of elements is displayed at a corresponding original size, and wherein the directional gesture was entered using an input instrument operated by the user;

in response to receiving the directional gesture:

predicting one or more desired elements currently displayed on the touch-enabled display screen, wherein the predicting is based on a direction of the directional gesture, and wherein the one or more desired elements are a subset of the plurality of elements;

cloning a portion of the current application display to create a cloned copy wherein the cloned copy includes only the one or more desired elements; and providing a virtual target window by displaying the cloned copy on the touch-enabled display screen at the original aspect ratio and in a position that places the one or more desired elements proximate to the input instrument operated by the user, wherein each of the one or more desired elements are displayed at their corresponding original size.

9. The information handling system of claim 8 wherein the actions further comprise:

identifying a magnitude of the directional gesture based on a length of the received directional gesture, wherein the predicting is based on the direction and the magnitude of the directional gesture.

10. The information handling system of claim 9 wherein the actions further comprise:

computing a directional likeliness score corresponding to one or more of the plurality of elements displayed on the current application display, wherein the computed directional likeliness score is based on the received direction and magnitude of the directional gesture in comparison to a position of each of the plurality of elements displayed on the current application display; and selecting the predicted one or more desired elements based on the directional likeliness scores.

11. The information handling system of claim 8 wherein the actions further comprise:

predicting an intent of the user based on one or more previously received past user actions, wherein the predicted one or more desired elements are based on the direction of the gesture and the predicted intent of the user.

12. The information handling system of claim 11 wherein the actions further comprise:

applying one or more weighting factors to the predicted intent of the user and the direction of the gesture to select the predicted one or more desired elements.

13. The information handling system of claim 8 wherein the providing of the virtual target window further comprises:

deactivating the current application display;

activating the virtual target window, wherein the virtual target window is pan-able and moveable on the touch-enabled display screen; and responding to a user action received at the virtual target window.

14. The information handling system of claim 13 wherein the actions further comprise:

receiving an element selection as the user action at the virtual target window;

removing the virtual target window;

re-activating the current application display; and invoking the element at the current application display that corresponds to the received element selection.

15. A non-transitory computer readable storage medium storing a computer program product comprising computer program code that, when executed by an information handling system, performs actions comprising:

receiving, from a user of a mobile device, a directional gesture entered on a touch-enabled display screen, wherein the touch-enabled display screen displays a current application display, comprising a plurality of elements, at an original aspect ratio, and wherein each of the plurality of elements is displayed at a corresponding original size, and wherein the directional gesture was entered using an input instrument operated by the user;

in response to receiving the directional gesture:

predicting one or more desired elements currently displayed on the touch-enabled display screen, wherein the predicting is based on a direction of the directional gesture, and wherein the one or more desired elements are a subset of the plurality of elements;

cloning a portion of the current application display to create a cloned copy, wherein the cloned copy includes only the one or more desired elements; and providing a virtual target window by displaying the cloned copy on the touch-enabled display screen at the original aspect ratio and in a position that places the one or more desired elements proximate to the input instrument operated by the user, wherein each of the one or more desired elements are displayed at their corresponding original size.

16. The computer readable storage medium of claim 15 wherein the actions further comprise:

identifying a magnitude of the directional gesture based on a length of the received directional gesture, wherein the predicting is based on the direction and the magnitude of the directional gesture.

17. The computer readable storage medium of claim 16 wherein the actions further comprise:

computing a directional likeliness score corresponding to one or more of the plurality of elements displayed on the current application display, wherein the computed directional likeliness score is based on the received direction and magnitude of the directional gesture in comparison to a position of each of the plurality of elements displayed on the current application display; and selecting the predicted one or more desired elements based on the directional likeliness scores.

18. The computer readable storage medium of claim 15 wherein the actions further comprise:

predicting an intent of the user based on one or more previously received past user actions, wherein the predicted one or more desired elements are based on the direction of the gesture and the predicted intent of the user.

19. The computer readable storage medium of claim 18 wherein the actions further comprise:

applying one or more weighting factors to the predicted intent of the user and the direction of the gesture to select the predicted one or more desired elements.

20. The computer readable storage medium of claim 15 wherein the providing of the virtual target window further comprises:

deactivating the current application display;

activating the virtual target window, wherein the virtual target window is pan-able and moveable on the touch-enabled display screen;

responding to a user action received at the virtual target window;

receiving an element selection as the user action at the virtual target window;

removing the virtual target window;

re-activating the current application display; and invoking the element at the current application display that corresponds to the received element selection.

\* \* \* \* \*